US009246857B2

(12) United States Patent
Moisa

(10) Patent No.: US 9,246,857 B2
(45) Date of Patent: Jan. 26, 2016

(54) METHOD AND SYSTEM FOR CORRELATING CONVERSATIONS IN A MESSAGING ENVIRONMENT

(71) Applicant: CTEXT TECHNOLOGY LLC, New York, NY (US)

(72) Inventor: Adam Moisa, New York, NY (US)

(73) Assignee: CTEXT TECHNOLOGY LLC, New York, NY (US)

( * ) Notice: Subject to any disclaimer, the term of this patent is extended or adjusted under 35 U.S.C. 154(b) by 0 days.

(21) Appl. No.: 14/581,178

(22) Filed: Dec. 23, 2014

(65) Prior Publication Data

US 2015/0180808 A1    Jun. 25, 2015

Related U.S. Application Data

(60) Provisional application No. 61/920,177, filed on Dec. 23, 2013, provisional application No. 62/000,220, filed on May 19, 2014, provisional application No. 62/061,308, filed on Oct. 8, 2014.

(51) Int. Cl.
| | |
|---|---|
| *G06F 15/16* | (2006.01) |
| *G06F 12/00* | (2006.01) |
| *H04L 12/58* | (2006.01) |
| *G06Q 10/10* | (2012.01) |

(52) U.S. Cl.
CPC ............ *H04L 51/046* (2013.01); *G06Q 10/107* (2013.01); *H04L 51/16* (2013.01)

(58) Field of Classification Search
USPC .......... 709/203, 206–207, 223–229, 250, 248
See application file for complete search history.

(56) References Cited

U.S. PATENT DOCUMENTS

| | | | |
|---|---|---|---|
| 7,185,057 | B2 | 2/2007 | Brown et al. |
| 7,200,635 | B2 | 4/2007 | Yashchin et al. |
| 7,475,110 | B2 | 1/2009 | Kirkland et al. |
| 7,885,641 | B2 * | 2/2011 | Tysowski ................... 455/412.1 |
| 8,001,184 | B2 | 8/2011 | Etgen et al. |
| 8,024,412 | B2 | 9/2011 | McCann et al. |
| 8,312,095 | B2 | 11/2012 | Chao |
| 8,473,553 | B2 | 6/2013 | McDevitt et al. |
| 8,543,927 | B1 * | 9/2013 | Mckinley et al. ............. 715/753 |

(Continued)

FOREIGN PATENT DOCUMENTS

| | | |
|---|---|---|
| WO | 2011005641 A2 | 1/2011 |
| WO | 2013113093 A1 | 8/2013 |
| WO | 2013116848 A2 | 8/2013 |

OTHER PUBLICATIONS

International Search Report and Written Opinion mailed May 21, 2015 in corresponding International Application No. PCT/US2014/072149.

*Primary Examiner* — Zarni Maung
(74) *Attorney, Agent, or Firm* — Myers Wolin, LLC

(57) ABSTRACT

A computer based method for correlating conversations is provided, including the steps of providing a discussion interface at an interface device, receiving an indication that one of several messages displayed at the discussion interface is part of an active conversation, providing a message entry location for imputing new messages associated with the discussion interface, and receiving new messages at the message entry location. New messages received are automatically associated with the active conversation by displaying them with a visual cue shared by all messages associated with the active conversation.

18 Claims, 20 Drawing Sheets

(56) References Cited

U.S. PATENT DOCUMENTS

| | | | |
|---|---|---|---|
| 8,725,813 B2* | 5/2014 | Nalliah et al. | 709/206 |
| 8,751,572 B1* | 6/2014 | Behforooz et al. | 709/204 |
| 2003/0093363 A1* | 5/2003 | Horsfall et al. | 705/37 |
| 2005/0138552 A1* | 6/2005 | Venolia | 715/526 |
| 2008/0177994 A1* | 7/2008 | Mayer | 713/2 |
| 2010/0023586 A1 | 1/2010 | Bauchot et al. | |
| 2010/0115426 A1 | 5/2010 | Liu et al. | |
| 2010/0125791 A1* | 5/2010 | Katis et al. | 715/716 |
| 2013/0042187 A1* | 2/2013 | Tysowski | 715/758 |
| 2013/0090138 A1* | 4/2013 | Carey et al. | 455/466 |
| 2013/0198296 A1* | 8/2013 | Roy et al. | 709/206 |
| 2014/0040784 A1* | 2/2014 | Behforooz et al. | 715/758 |
| 2015/0026283 A1* | 1/2015 | Carey et al. | 709/206 |

* cited by examiner

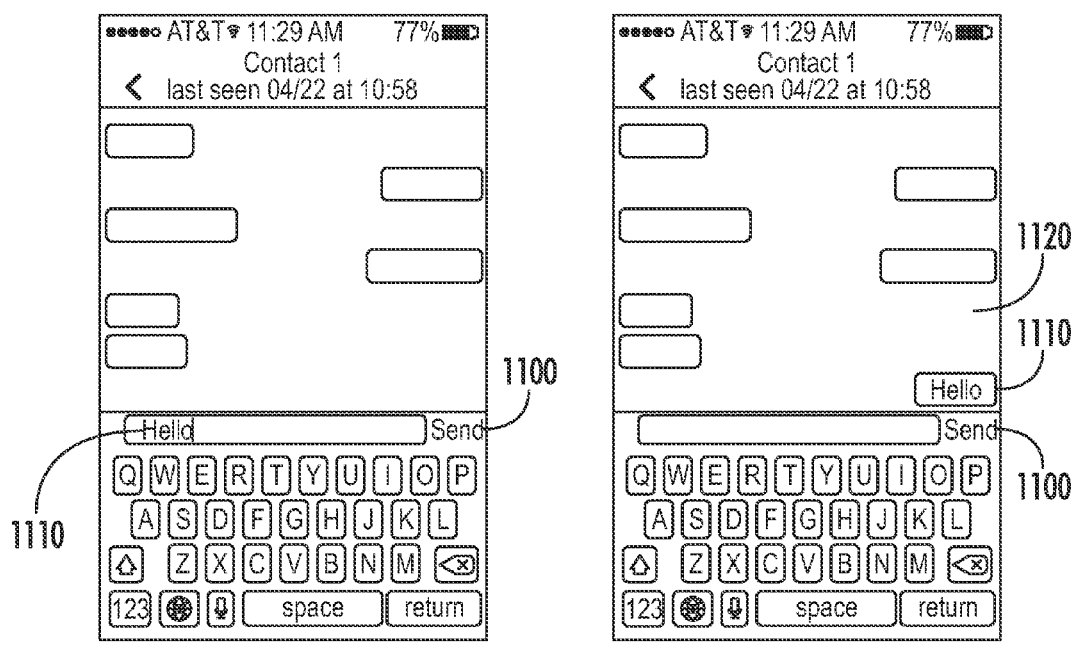
*FIG. 10A*     *FIG. 10B*

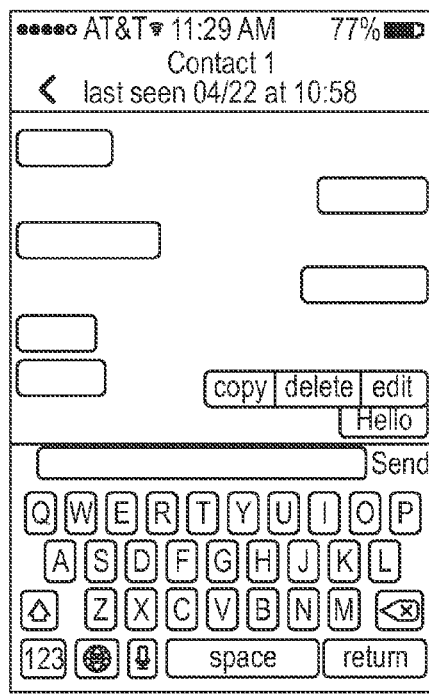 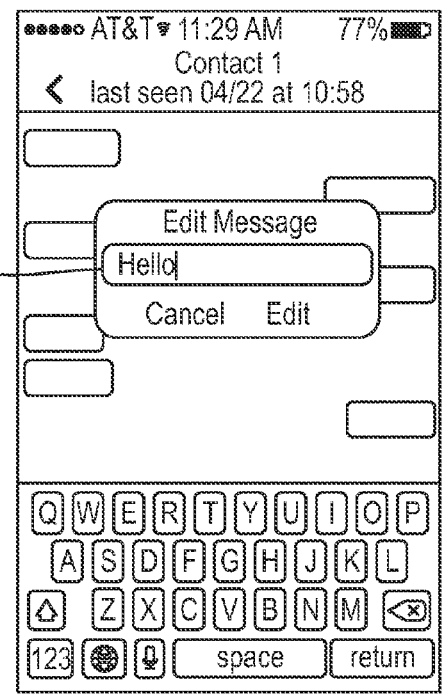
*FIG. 10C*  *FIG. 10D*

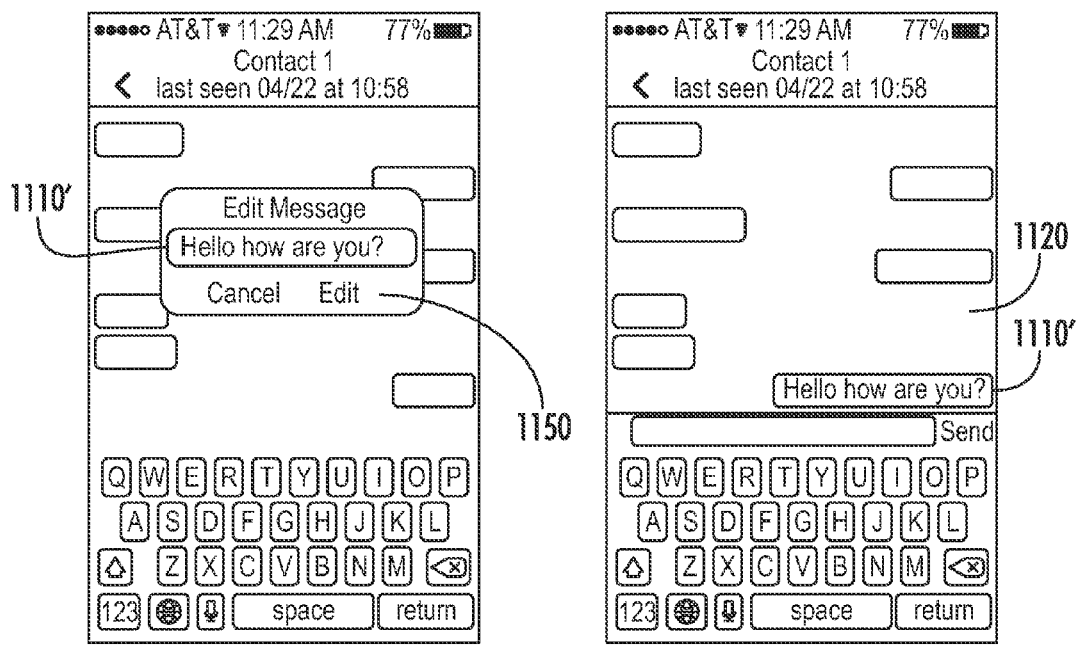
*FIG. 10E*  *FIG. 10F*

METHOD AND SYSTEM FOR CORRELATING CONVERSATIONS IN A MESSAGING ENVIRONMENT

CROSS REFERENCE TO RELATED APPLICATIONS

This application claims the benefit of U.S. Provisional Patent Applications, No. 61/920,177, filed Dec. 23, 2013, No. 62/000,220, filed May 19, 2014, and No. 62/061,308, filed Oct. 8, 2014, the contents of each of which are incorporated by reference herein in their entirety.

FIELD OF THE INVENTION

The present disclosure relates to methods and systems for correlating conversations in a messaging environment, such as in a chat application for a mobile phone.

BACKGROUND

Various forms of electronic communications have become ubiquitous in recent years, with internet technologies allowing for new and rapid forms of communications. These forms of communications, such as instant messaging, often rely on a "chat" interface, for transmitting short messages, referred to as "chats," rapidly between users. These chats often form an extended dialogue between multiple parties, stretching across multiple conversation topics and extended periods of time. Accordingly, while a participant in such a dialogue may continue to submit chats responsive to earlier received chats, it is often unclear what earlier question or prompt the participant is answering or responding to.

Accordingly, a first chat participant may send two questions, and a second chat participant may respond to the second question prior to responding to the first question. This may occur for a variety of reasons. For example, the second chat participant may not wish to respond to all questions, or the questions may have been delivered to him out of order. Alternatively, the response order may have simply made sense to the second user at the time, or the response order may differ for any number of other reasons.

Extended chat sessions therefore often comprise different types of messages, such as questions, prompts, offhand comments, and answers, and typically involve multiple conversations continuing in parallel, with messages, or chats, presented to users in chronological order. This simple chronological ordering can lead to confusion, since it may not be clear what the participant is responding to in any particular chat, particularly where the participants switch between topics rapidly.

For a variety of reasons, in various other communication formats, it is not always clear what earlier comment a particular comment is responsive to. For example, an email may include questions on multiple topics, while a response may respond to those questions out of order. The same issues occur in online commenting systems, and the issues are enhanced when more than two participants are involved in a chat.

There is a need for a messaging method that allows parties conversing to follow multiple conversations exactly, even where those multiple conversations are intertwined and include questions, prompts, and answers that cross each other chronologically.

SUMMARY

A computer based method for correlating conversations in a messaging environment is provided, wherein a user is provided with a discussion interface at a first interface device, and messages are displayed at the discussion interface. The messages displayed can include a first and second message. An indication, such as a tapping input, is then received, at the interface device, that a previously displayed message is part of an active conversation. The active conversation may be, for example, one of several previously existing conversations. Alternatively, the message selected may have no previous conversational associations, and may therefore be defined as a new conversation, which is then defined as "active."

The method then provides a message entry location for inputting new messages, the message entry location associated with the discussion interface. New messages received at the message entry location are associated with the conversation defined as active, and when displayed, the new message is then displayed incorporating a visual cue shared by all messages of the active conversation. The visual cue may be, for example, the color coding of messages.

The conversational affiliations may be applied after messages are entered as well, such that messages in the discussion interface are first displayed without incorporating a visual cue, and are later modified to incorporate a visual cue.

The method may then receive an indication that a different message or a second conversation is to be defined as the active conversation, cancelling or replacing the earlier definition of the active conversation, and new messages then received at the message entry location are defined as part of the then current active conversation. Accordingly, the display of such new messages incorporates a second visual cue shared by messages associated with the second conversation, the second visual cue different than the first visual cue. For example, each of the first visual cue and the second visual cue may be a different background color for the messages.

The visual cues may be applied while the messages remain listed in the chronological order in which they were received, or they may be reorganized to reflect groupings of conversation. In some embodiments, visual elements are applied to the discussion interface or the message entry location to highlight the identity of the active conversation. In such embodiments, the visual cue may be reflected in the visual elements, or the visual elements may be a tint in the same color as the visual cue.

The visual cue may be a proximity from message to message, such that a new message is displayed at a location within the discussion interface in closer proximity to the first message relative to the proximity of the second message to the first message.

Typically, the platform described may allow the method to be applied across multiple interface devices. In such embodiments, changes made at the first interface device, such as identification of active conversations and the affiliation of comments with different conversations, are reflected at a second interface device using visual cues. This may be coordinated by a server having a conversation index, and each user may have different visual cues defined in user settings.

For implementing the methods described, a system for correlating conversations is provided, the system comprising an interface device in communication with a computerized network. The interface device then comprises a processor for implementing a software application, memory for storing the software application and for storing a plurality of messages in accordance with the software application, a transmission unit for transmitting messages to the computerized network, and a display. The software application comprises instructions for providing a discussion interface at the display of the user interface device for displaying messages stored in the memory, recording an indication that one of several conversations, each comprising one or more of the messages stored in memory, is an active conversation, and providing a message entry location for entering new messages, the message entry location associated with the discussion interface, receiving at least one new message entered at the message entry location, transmitting, using the transmission unit, the at least one new message to the computerized network incorporating an indication of which of the several conversations was the active conversation at the time of entry of the new messages, and displaying, at the display, the at least one new message alongside the several conversations and incorporating visual cues shared with any messages that are part of the conversation that was the active conversation upon entry of the at least one new message.

BRIEF DESCRIPTION OF THE DRAWINGS

FIGS. 10A-10F show a user interface, such as that of FIGS. 3A-G, implementing the retroactive editing features of FIG. 9.

DETAILED DESCRIPTION OF THE PREFERRED EMBODIMENTS

Figure 1:
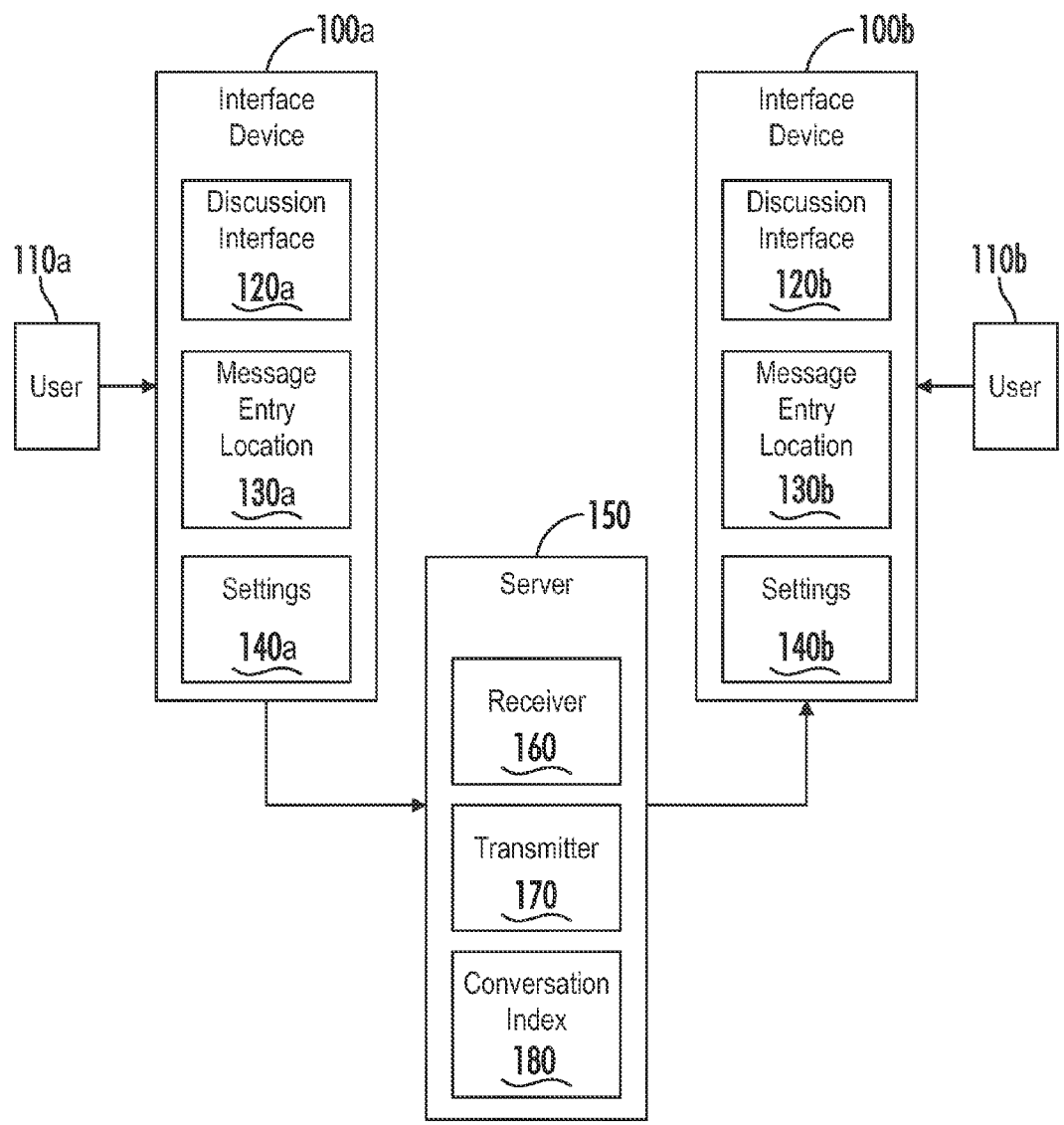
FIG. 1 shows an exemplary system for implementing the method for correlating conversations.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Described below are various methods and systems for correlating conversations in a messaging environment, such as in situations where multiple conversations, or conversation threads, are occurring within a single chat window or other messaging environment. The method and system are described with reference to a computer system utilizing user interface devices, such as those shown in FIG. 1. Typically, the method is performed on and between a first interface device 100a, used by a first user 110a, and a second interface device 100b, used by a second user 110b. Each user 110 uses their respective user interface device to create and transmit messages as part of various conversations. A first user may then select a conversation from a discussion interface and create a message to transmit to the second user 110b as part of the conversation selected. To effectuate such a message transmission, as described in more detail below, each interface device 100 is then provided with a discussion interface 120a, b, a message entry location 130a, b associated with the discussion interface, and several settings 140a, b associated with the discussion interface and the message entry location. The interface devices may be, for example, portable computing devices, such as smart phones, tablets, laptops, or other types of computer terminals. The interface devices typically interface with a computerized network, such as a server 150 as described below, and they may contain any hardware necessary to do so, such as transmitter and receiver components.

The interface devices 100a, b typically connect to each other through a server 150. The server then maintains a receiver 160 and a transmitter 170, and a conversation index 180. When the first user 110a, for example, selects a conversation to and transmits a message to the second user 110b, the first interface device 100a transmits the message to the server 150, which receives the message at the receiver 160, determines if the message is part of a conversation in the conversation index 180 and sends it, via the transmitter 170 to the second interface device 110b. In the discussion below, to be considered alongside the flowcharts and the figures, when the first interface device 110a transmits a message to a second interface device 110b, or vice versa, such transmission may be by way of server 150. In such a scenario, it will be understood that the server will utilize the receiver 160, transmitter 170, and conversation index 180 as necessary.

Figure 2:
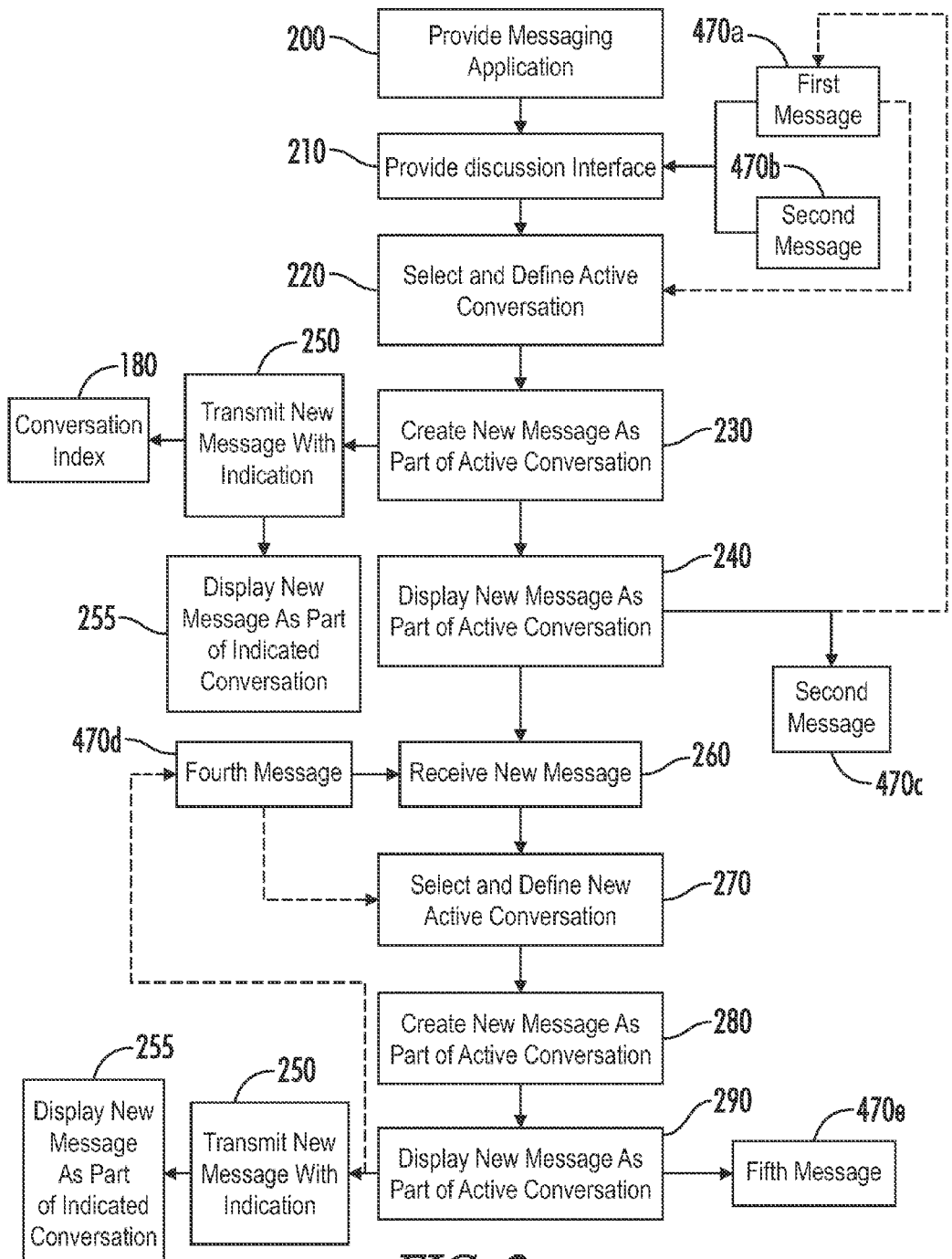
FIG. 2 is a flowchart of the method for correlating conversations.

FIG. 2 is a flowchart illustrating an implementation of the method of correlating conversations and FIGS. 3A-G show an exemplary user interface implementing the method of correlating conversations.

Figure 3A:
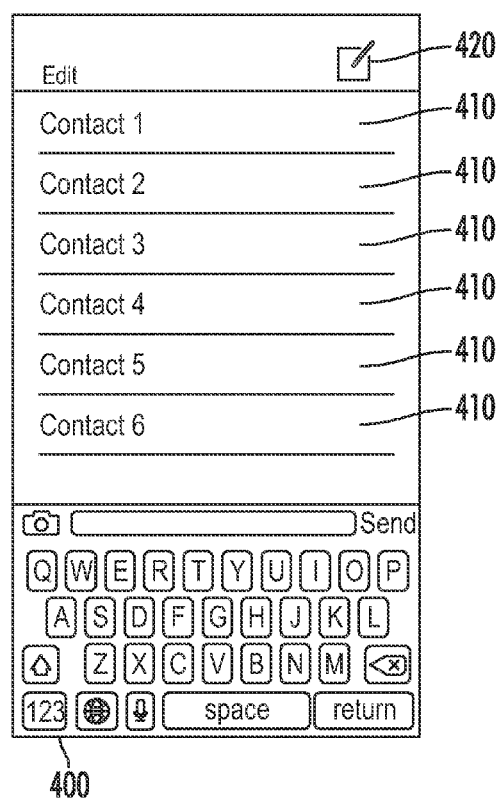
FIGS. 3A-G illustrates an exemplary user interface for implementing the method of FIG. 2.

Initially, the first user 110a is provided with a messaging application (200) having a user interface 400. The user interface may provide a list of contacts 410 with whom the user has active chat sessions. The user interface 400 may then provide an option to create a new chat session 420, or a user 110 may instead choose to continue a previously active chat session with one of the contacts listed 410, as shown in FIG. 3A.

Figure 3B:
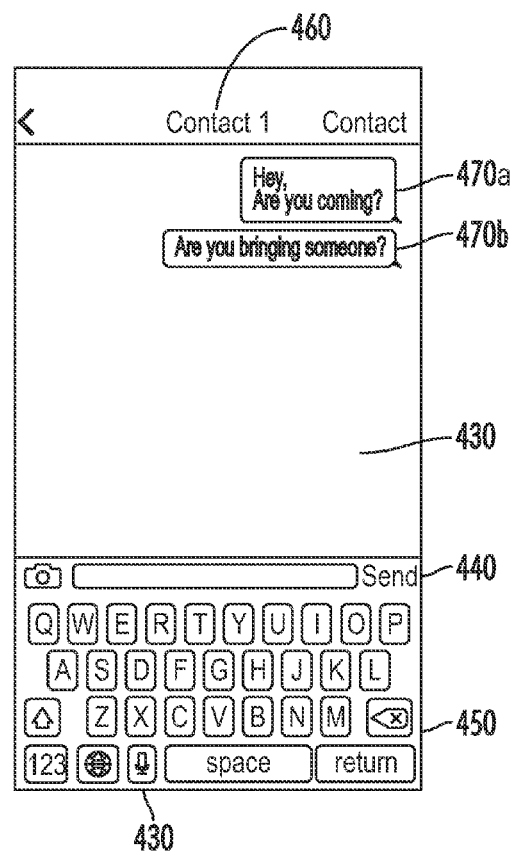

Upon selecting an active chat session 410, as in FIG. 3B, the user is provided (210) with a discussion interface 430. The discussion interface 430 has a message entry location 440 associated therewith, and may further incorporate a virtual keyboard 450 or other data input tools. The name of a party 460, such as the second user 110b with whom the first user 110a is chatting, may be identified within, or in association with, the discussion interface 430.

Upon providing the discussion interface 430 at (210) for an active chat session, several messages 470a, b may be displayed therein. This method connects messages in terms of "conversations," and thereby ultimately assigns messages to such conversations. Accordingly, messages interacted with may be previously assigned to such conversations, and in such a scenario the first message 470a may be part of a first conversation, and the second message 470b may be part of a second conversation. Alternatively, the messages 470 may be initially unassigned to conversations. In the embodiment shown, the messages 470 may therefore be provided with default visual cues designating the messages as unassigned to conversations, in contrast with visual cues correlating conversations as discussed below.

The first user 110a may wish to continue a conversation from, or provide a message responsive to, one of the several messages 470. Accordingly the first user 110a may indicate, or call out to the system, which one of the messages 470 he would like to respond to by, for example, tapping a touch screen of the first interface device 100a at a location of the first message 470a. Other selection methods, such as highlighting, are contemplated as well. This indication defines that message, or a conversation that the message is a part of, as an active conversation (220), and indicates that a following new message will be part of that active conversation. The first message 470a is used merely as an example, and any message shown may be tapped to define an active conversation.

Accordingly, if the first message 470a was previously part of a first conversation, the first conversation is defined as the active conversation. If the message was not previously defined, it would then be assigned to a first conversation and the first conversation would be defined as active.

Figure 3C:
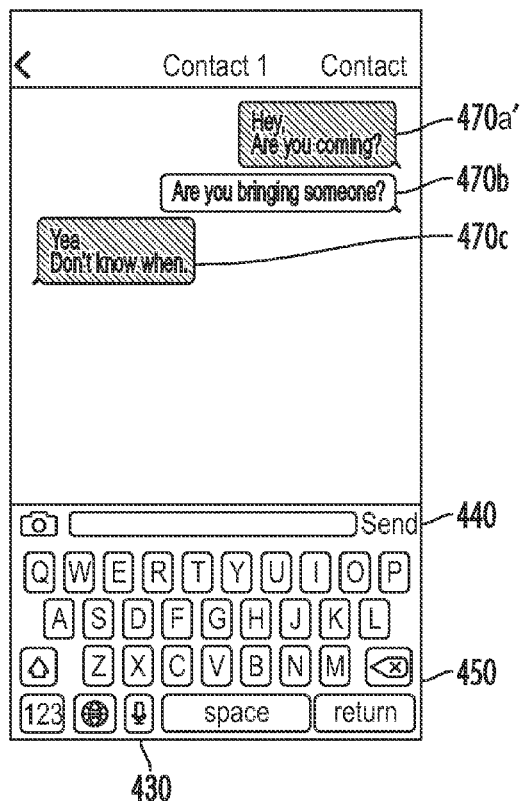

As shown in FIG. 3C, future messages transmitted from the first interface device 100a will then be automatically assigned to the active conversation, so long as the active conversation is defined. When the user 110a creates a new message (230) at the message entry location 440, the message 470c is therefore incorporated into the conversation that has been defined as active. When the new message is then displayed (240), it is displayed with a visual cue shared with other messages associated with the active conversation, in this case the first message 470a. Typically, the visual cue may be a color associated with the active conversation, but it may instead be by way of text size, symbols or icons appended to the message, indentation levels, font formatting such as italics, bold, or underline, bullet styles, or characters preceding the message. As shown in the figures, the active conversation may be provided with a crosshatching matching other messages 470a of the active conversation.

The first user 110a may then, using the interface device 100a, transmit the new message to the second user 110b. Accordingly, while the new message is displayed (at 240) at the first user's 110a interface device 100a it may be simultaneously transmitted (250), along with an indication that it is part of the conversation that has been marked as active, to the server 150 where it is logged at the conversation index 180, and transmitted by the transmitter 170 to the second user 110b. The message may then be displayed (255) as part of the then active conversation when displayed on the second user interface device 100b.

Typically, the second user 110b will receive the conversational affiliations defined by the first user, but will not have the conversation selected by the first user defined as an active conversation on his interface device 100b. Accordingly, when the first user 110a taps a message, defining a conversation, the color may change on the second user's device, but new messages entered at the second interface device 100b will not be automatically associated with that conversation.

In this way, the platform creates linkages between messages that are part of a conversation. Because the linkages defined in this method may be implemented and recorded independently of the particular visual cue, and because each message is typically transmitted from a first user 110a to a second user 110b using server 150, the conversation records may be maintained at the server 150 in the conversation index 180, and the linkages may be represented in accordance with settings 140 at each individual interface device.

Figure 3D:
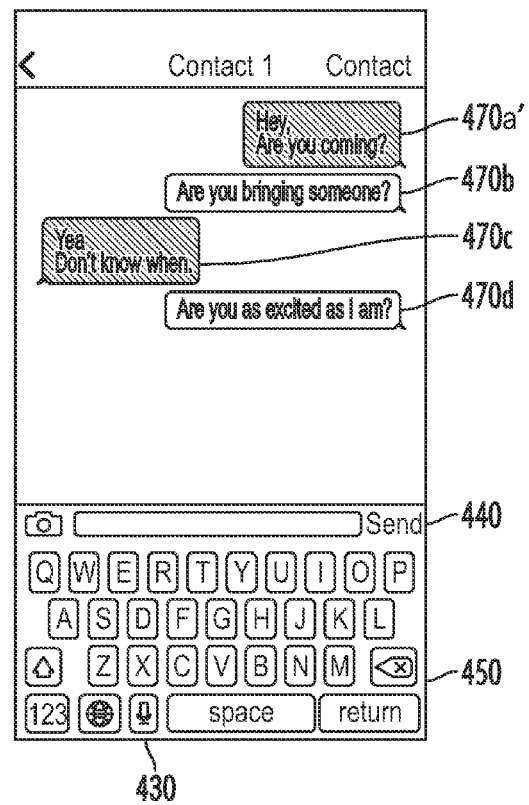

As shown in FIG. 3D, throughout the process, the first user 110a may receive (260) additional messages 470d from, for example, the second user 110b utilizing a second interface device 100b. These messages may arrive already defined as part of a previously existing conversation, or they may arrive as individual messages with no conversational affiliation. If the additional messages 470d arrive as individual messages, they will be provided with default formatting and visual cues, but if they are already defined as part of a previously existing conversation, they will be provided with visual cues matching other messages that are part of that particular conversation. Information about whether such incoming messages are part of a previously existing conversation may be received, for example, from server 150 and may be stored in the conversation index 180. Alternatively, such indications may be embedded in the messages themselves using a markup tagging system, for example. In this way, the method may be performed without an independent conversation index, and may be entirely implemented as a peer to peer chat platform.

The first user 110a may then wish to continue a conversation from, or provide a message responsive to, another one of the several messages 470. For example, the user may wish to define the just received message 470d as part of a second conversation. Accordingly the first user 110a may indicate that they would like to respond to the just received message 470d by, for example, tapping a touch screen of the first interface device 100a at the location of the message 470d. As before, this selection defines that message as part of a new active conversation (270), now a second conversation, and indicates that a following new message will be part of that active conversation. When a new, or different conversation is defined as the active conversation in this manner, any previous indication of a different message as part of the active conversation is revoked, such that only one conversation (either the first conversation, comprising the first and third messages 470a, c or the second conversation, comprising the new message 470d, for example) is active at any given time.

Figure 3E:
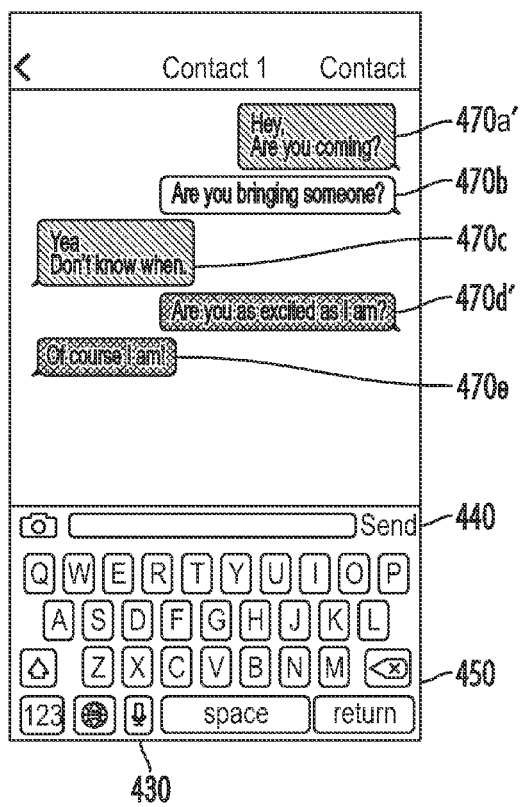

As above, when the user 110a then creates a new message (280) at the message entry location 440, the message 470e is incorporated into the conversation that has been defined as active. When the new message is then displayed (290), it is displayed with a visual cue shared with other messages associated with the active conversation. Accordingly, as shown in FIG. 3E, the two messages of the second conversation 470d', e, defined as active, are provided with matching crosshatching.

Figure 3F:
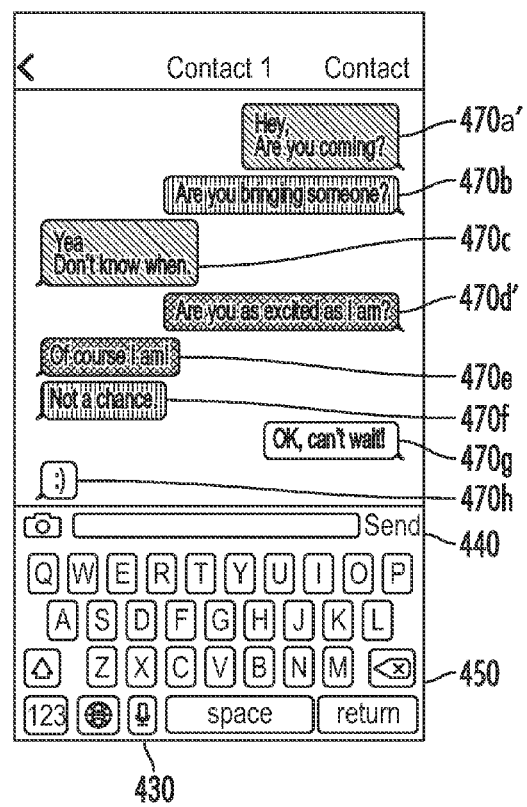
Figure 3G:
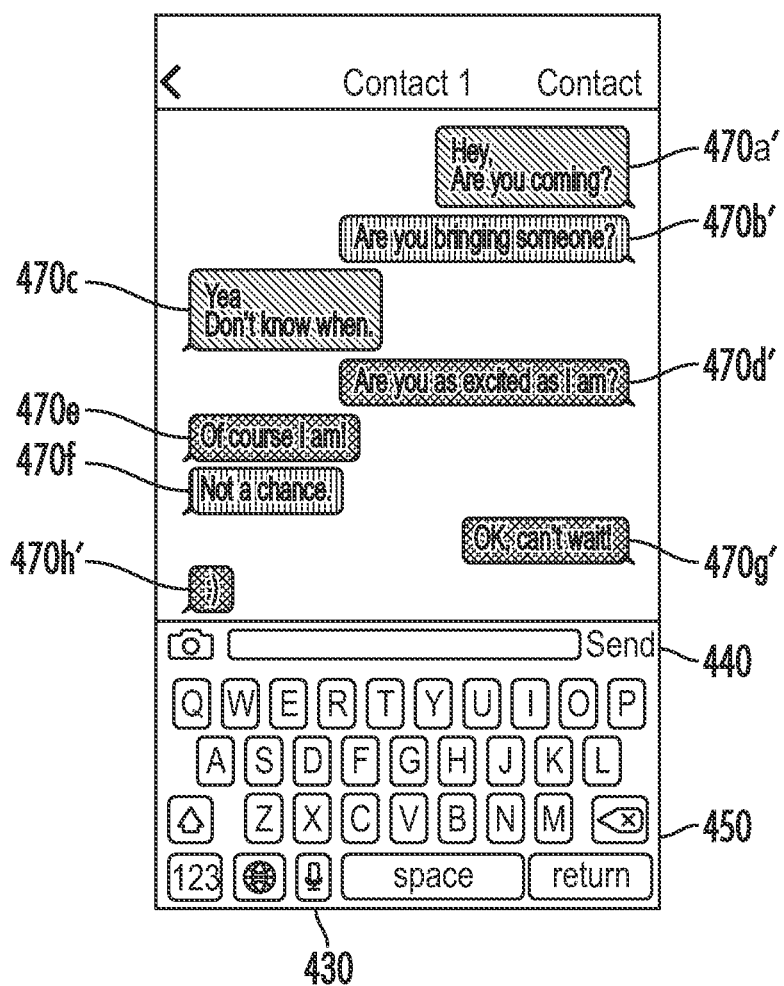
Figure 4:
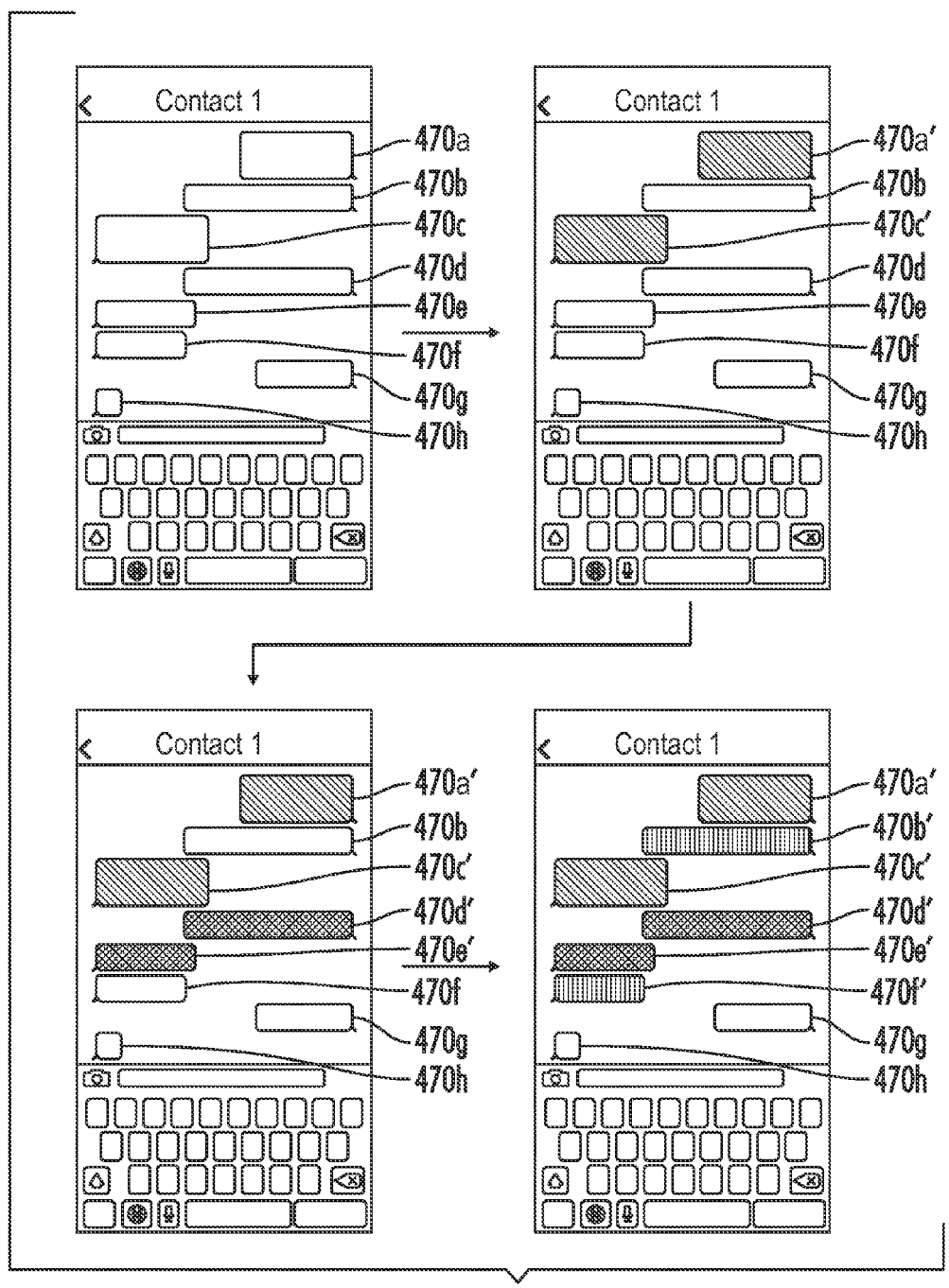
FIG. 4 illustrates an additional aspect of the user interface of FIG. 3A-G.

The method can continue in this manner, such that the first user 110a may select an earlier received or displayed message 470b, defining it as a part of an active conversation (now a third conversation) and create a new message 470f to match a visual cue consistent across the third conversation. Similarly, messages initially transmitted, created, or received by a user without an active conversation defined 470g may appear with default visual cues. A user may choose not to define an active conversation, or may cancel out a previous selection of an active conversation, thereby continuing to transmit or receive messages 470h with default formatting. Such messages may later be retroactively applied to conversations resulting in visual cues being applied after the fact, as in 470g', h' as shown in FIG. 3F-G FIG. 4 shows a discussion interface displaying a conversation substantively identical to that discussed with respect to FIGS. 2-3, but without any conversational affiliations applied. In such a scenario, all messages 570a-h are shown with default formatting. The first user 110a may then retroactively assign all messages to conversations. This may be done by, for example selecting multiple messages simultaneously, thereby linking them together, or by selecting conversations from a dropdown menu associated with each message, thereby assigning the messages to selected conversations. Accordingly, a user may first select the first and third messages in a list 570a, c, and assign them to a first conversation comprising those messages 570a', c', a fourth and fifth message in the list 570d, e, and assign them to a second conversation, and a second and sixth message in the list 570b, f, and assign them to a third conversation.

As shown, messages may therefore be created or received with conversational affiliations already incorporated, or they may be created without an active conversation defined or received without such an affiliation, and may therefore be created or received with default visual cues applied. Conversational affiliations may then be applied using a prompt, menu, or other scheme implemented in the interface.

While the methods have been described with respect to a first user 110a, all messages generated at one of the interface devices 100 are typically transmitted to the other. Accordingly, linkages defined by each user appear at the discussion interfaces 120 of both users, with each user's display formatted according to their own settings 140. Therefore, conversational affiliations defined across both user interfaces may be defined by visual cues independently defined based on user settings 140.

Figure 5:
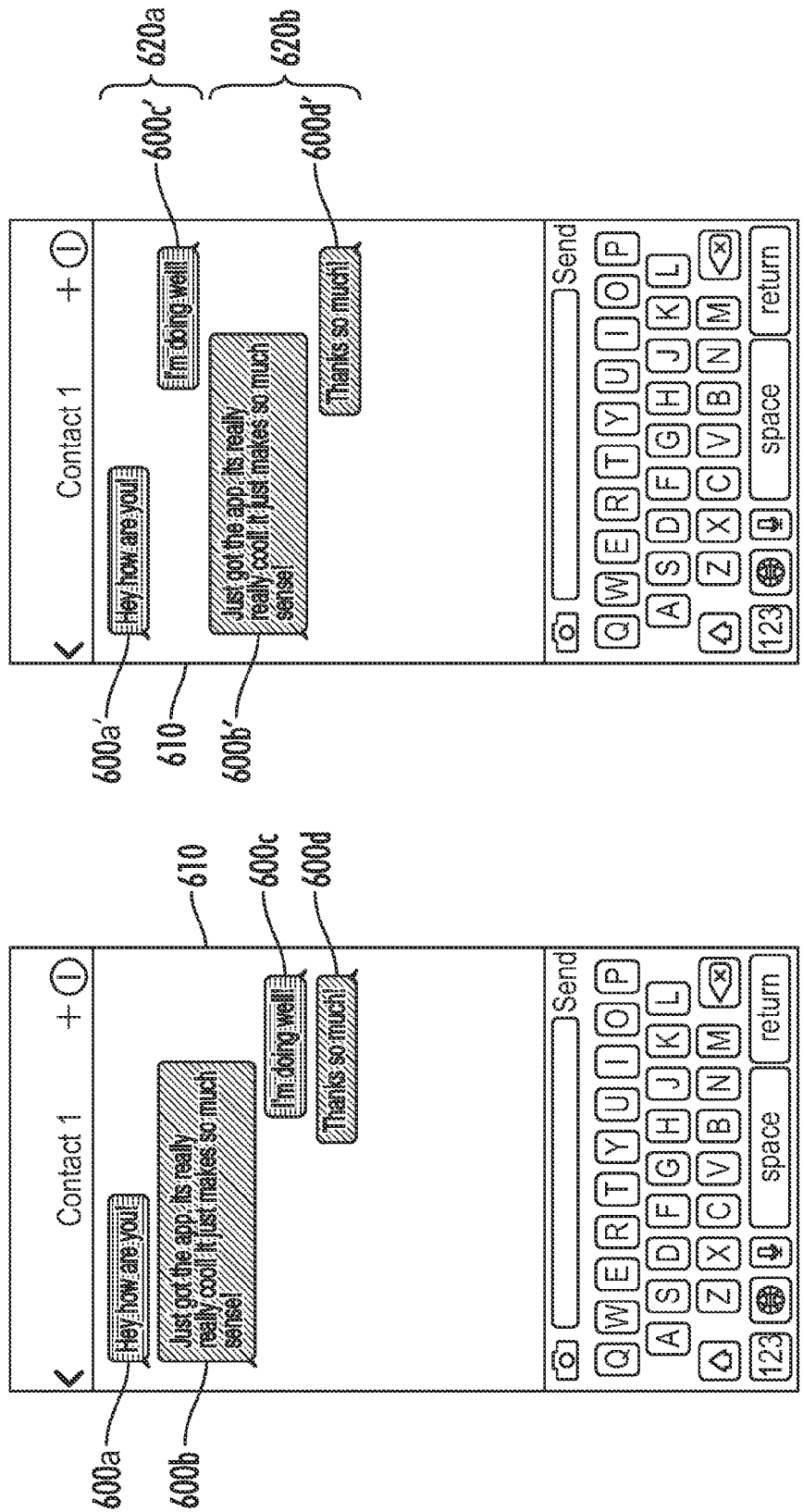
FIGS. 5A-B illustrate an alternative visual cue for use with the user interface of FIG. 3A-G.

FIGS. 5A-B show the use of the alignment of messages in a list of messages as a part of a visual cue correlating conversations. Messages 600a-d are displayed in a discussion interface 610 in the order in which they are initially received. They may be received with indications assigning them to first and second conversations, or they may be received without such indications and may be assigned to such conversations after the fact. Once assigned, the messages are then realigned to show them in first and second blocks 620a, b representing the first and second conversations. Accordingly, the first message 600a' may be shown in a first block 620a with the third message 600c and the second message 600b' may be shown in a second block 620b with the fourth message 600d'. The realignment may occur upon receipt of conversation assignments for the messages 600a-d, or it may instead occur after receiving a command to align from a user. Accordingly, a user may first see a new message just received at the bottom of a list, and may input a command to have the messages realigned. In some such scenario, the messages may return to their originally received order after such command expires, such as after a period of time, so that the chronological integrity of the chat window is maintained.

In each of the scenarios discussed, the first user 110a may assign messages to conversations, and the method may then apply visual cues illustrating the specific conversation to which each message has been assigned. In some embodiments, either the first user 110a or the second user 110b may reassign messages previously assigned. In such a scenario, the new assignment may be transmitted to the server 150 which may in turn record the new assignment at the conversation index 180 and transmit the new assignment to the other user 110 such that the new assignment can be reflected in each respective discussion interface 430.

Accordingly, if a second user 110b disagrees with the first user's 110a assignment of a message to a conversation, or wishes to select a single previously assigned message to begin a new conversation, he may select that message using an appropriate selection method. For example, a user may double tap a message to bring up a contextual menu, or to perform a specific action. Such selection methods may be defined in user settings 140 specific to each interface device 100.

Where additional messages are added to the discussion interface, the interface may scroll to accommodate new messages. Accordingly, earlier messages may be forced off of a screen of the interface device 100, and a large number of independent conversations may be defined simultaneously. When visual cues of the users 110 preferred type are exhausted, the cues may recycle. Accordingly, when the platform runs out of colors with which to color code, the platform may select an appropriate color to reuse by monitoring, for example, a visual cue associated with the conversation that has not been used in the longest period of time. Messages that are forced off screen, but that still exist within the discussion interface 430 may be accessed by scrolling upwards, and when viewed, may retain their visual cues identifying the conversation they are associated with.

In some embodiments, where a user has selected an active conversation but has not entered a message in an extended period of time, the platform removes the active conversation designation, returning the user to a default mode.

While the method for correlating conversations in a messaging environment is discussed with respect to a two user "chat" application, it may be applied in a wide variety of additional types of messaging environments, such as within an email, in a group chat interface, or in a commenting system on a website. Each of these scenarios will be described, and additional features more easily illustrated with respect to those environments will be described therewith.

Figure 6:
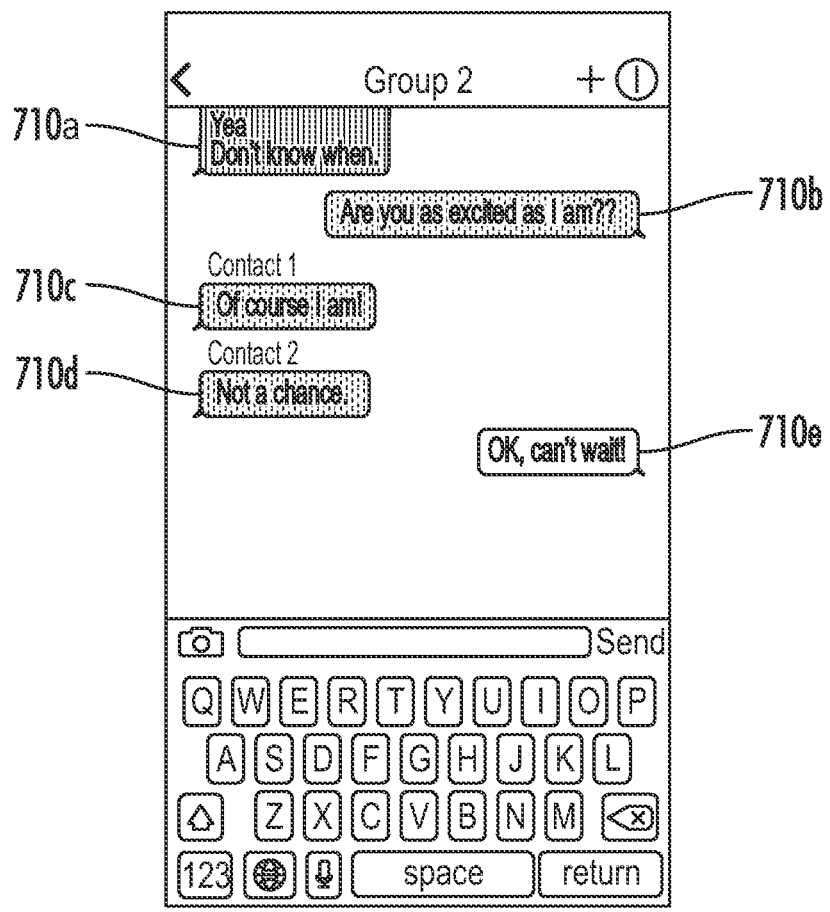
FIG. 6 shows an alternative implementation of the method of FIG. 2 incorporating a group chat interface.

FIG. 6 shows the method for correlating conversations applied to a group chat interface 700. Such an interface may be nearly identical to the that discussed above with respect to discussion interface 430, but may allow users to receive messages from both a second user 110b at a second interface device 100a, and a third user at a third interface device (not shown). In such a scenario, users 110 may indicate that a message is part of a specified conversation, and visual cues may then be applied in the same way as discussed above. Accordingly, the group chat environment may show several messages 710a-e with a first message 710a correlated with a first conversation, a second, third, and fourth message 710b-d shown as part of a second conversation, and a fifth message 710e shown as part of a third conversation. Messages from other users are individually marked by, for example, indicating their name in association with the comment.

FIGS. 7A-F shows the method for correlating conversations applied to an email interface. As shown the first user 110a may receive an email in a received email window 800 showing received or transmitted messages at the first user interface 100a which has multiple topics, each comprising different subject matter, and the user may wish to respond to each of those topics independently. While the email may initially be shown as a single block of text, or as a series of paragraphs without any distinctive formatting, multiple clauses 810a-d, each of which may be responded to independently.

As in the discussion interface 430 discussed above, the email application may be provided with a message entry location 820 for inputting an email responsive to a message or messages shown in the received email interface.

Figure 7A:
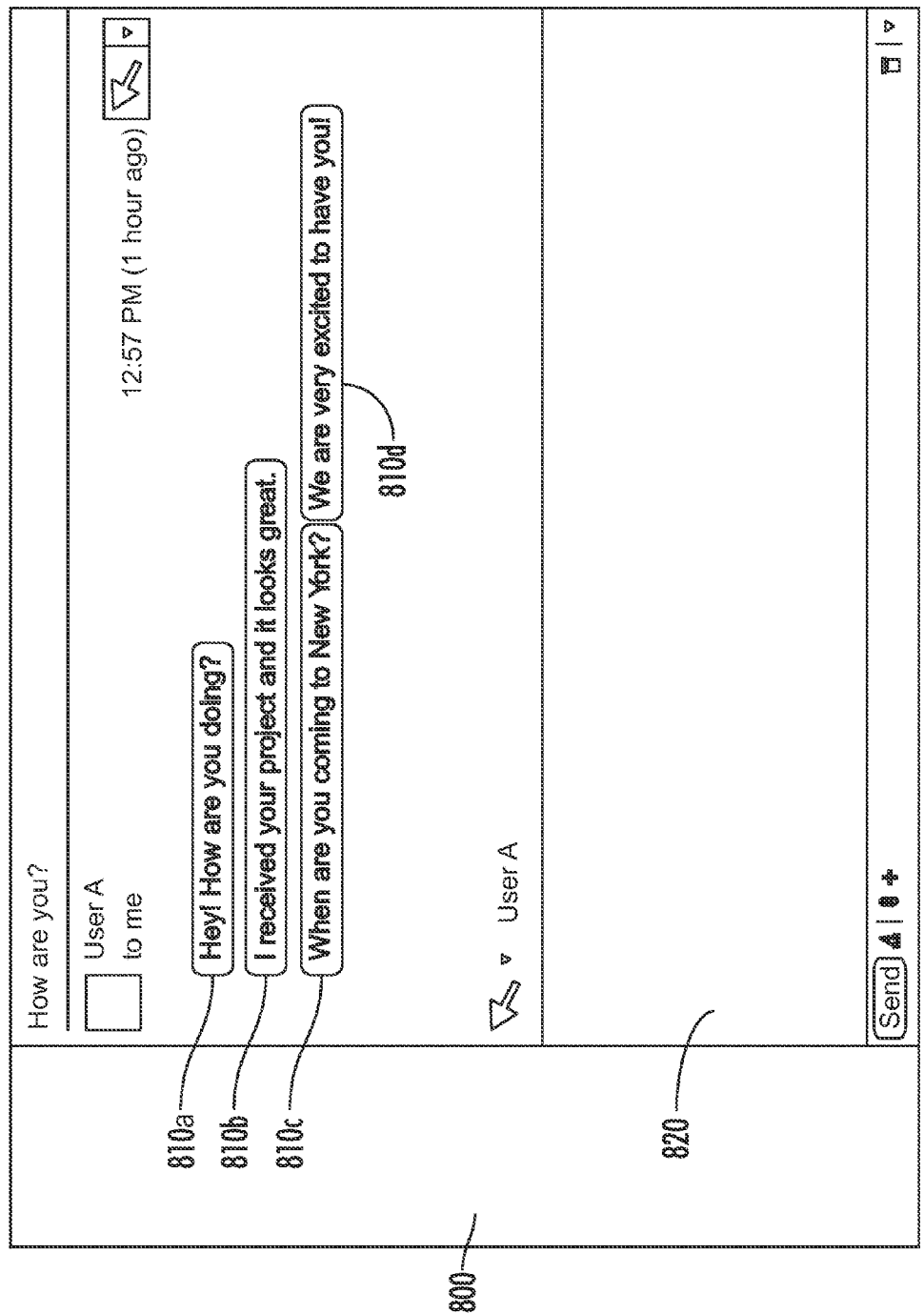
FIGS. 7A-F shows the method of FIG. 2 implemented in an email interface.
Figure 7B:
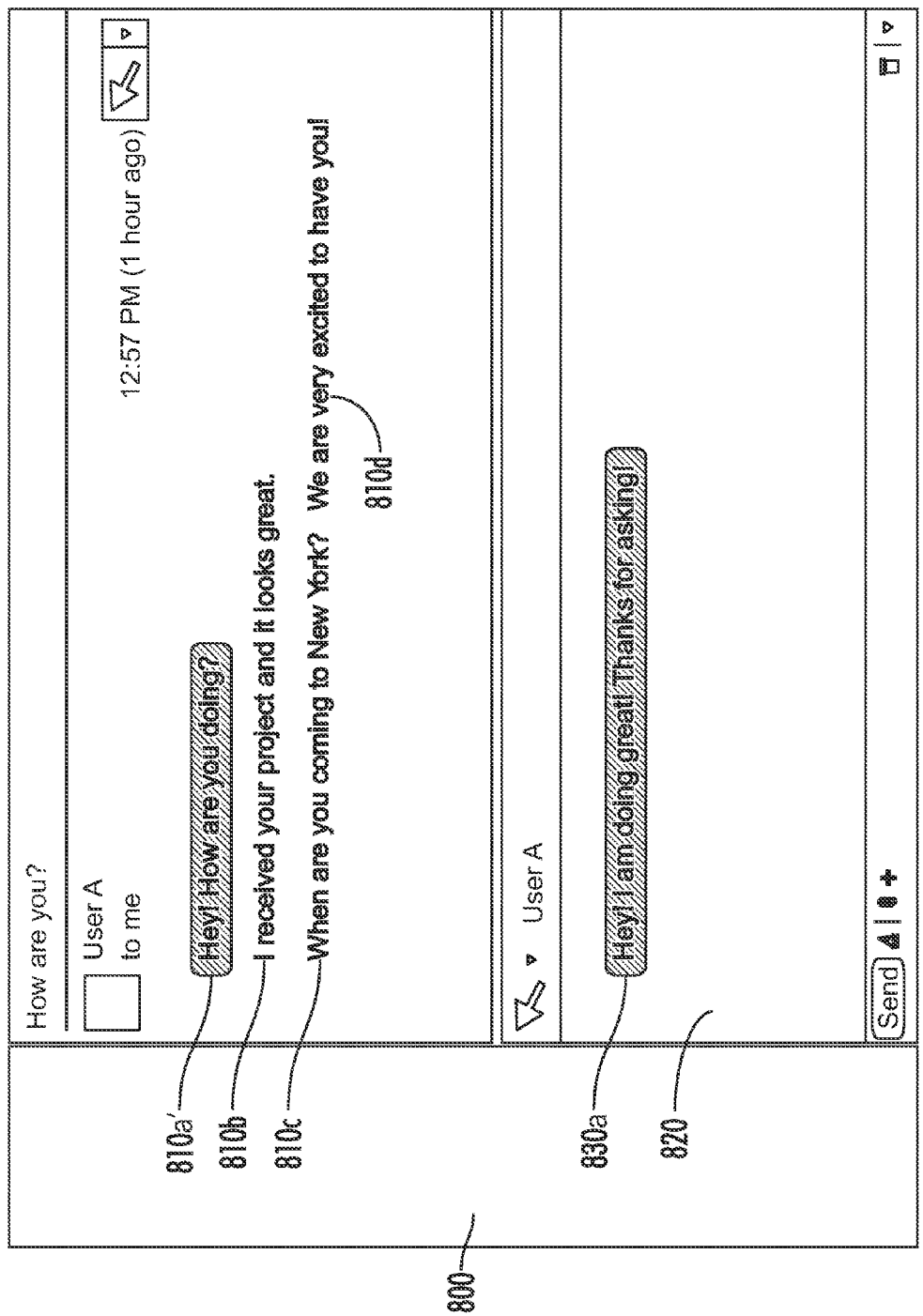
Figure 7C:
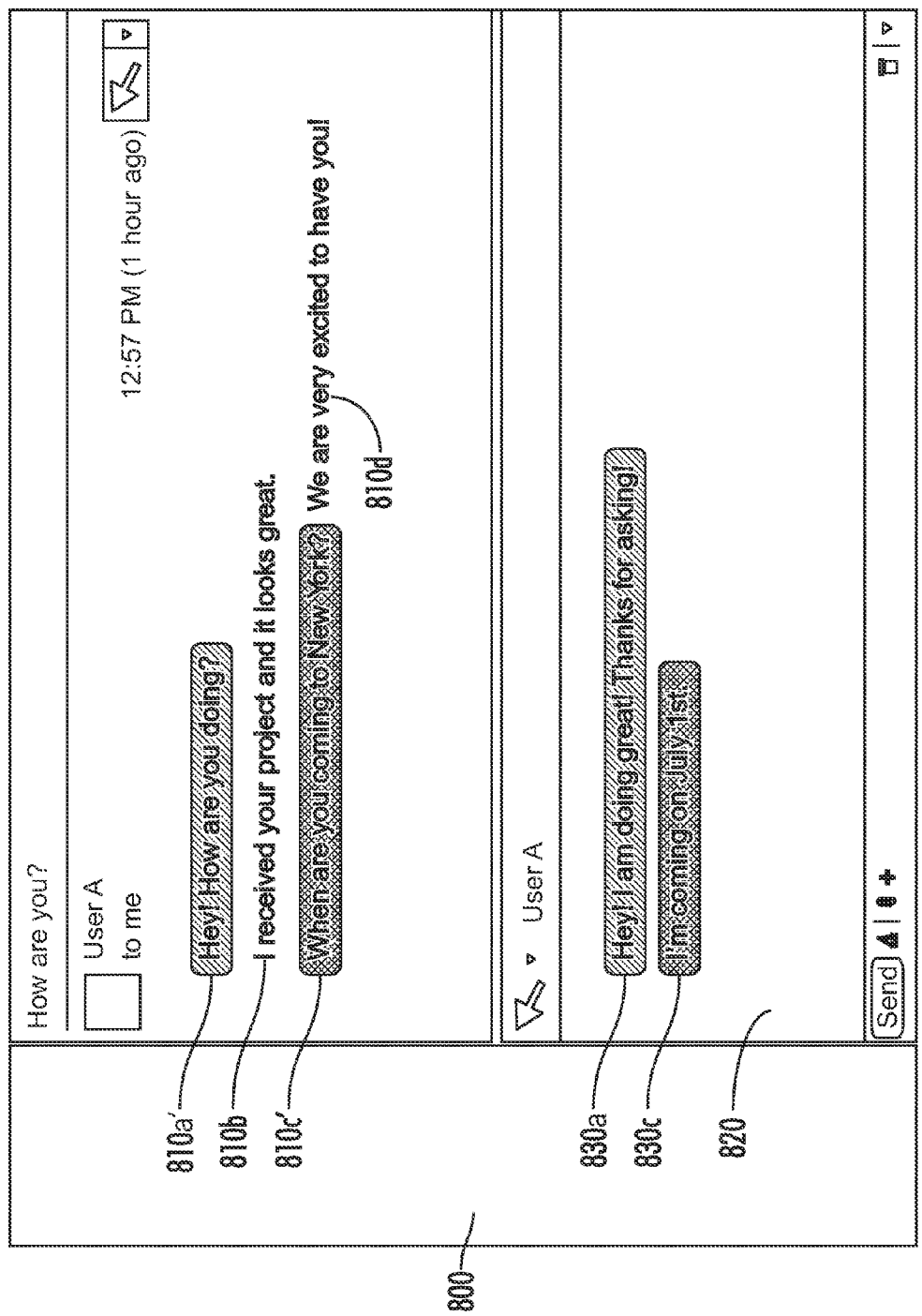
Figure 7D:
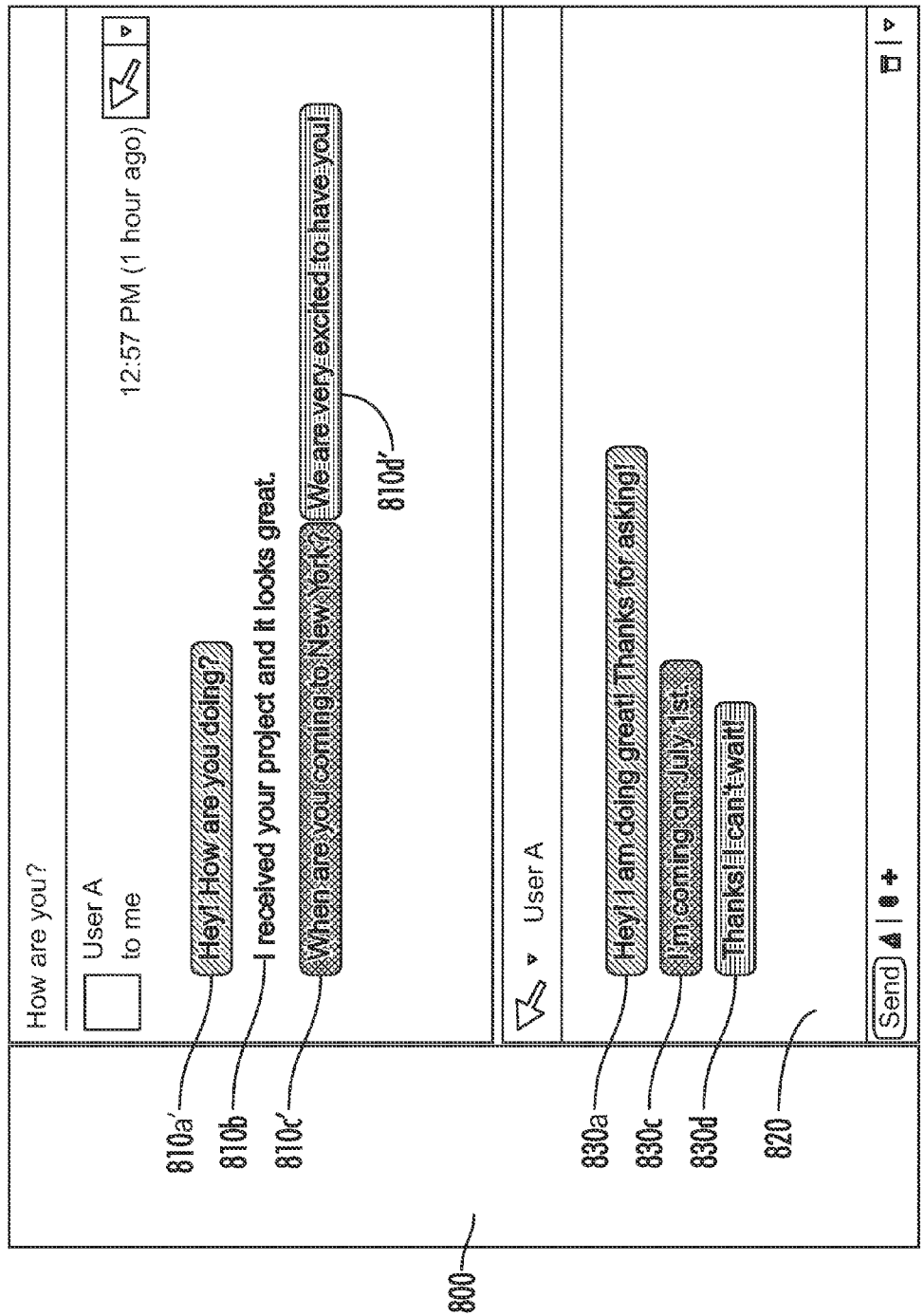

Accordingly, a user 110 may select a first clause 810a to define as part of a first conversation, and may then input, at the message entry location 820, a message responsive to that first clause 830a, as shown in FIG. 7B. The user 110 may then select a different clause, such as the third clause 810c, and draft a response 830c responsive to that clause, as shown in FIG. 7C.

The user 110 may continue in this manner, selecting a different clause, such as the fourth clause 810d, and drafting responses 830d.

As shown, the user 110 may determine how to break up individual paragraphs, or even sentences, to define the clauses 810a-d to respond to. Such a feature is more easily illustrated with respect to an email interface than with respect to a chat interface, since emails often incorporate longer paragraphs that may contain multiple clauses that require independent responses. Here, the user 110 would like to respond to a question posed in the third clause 810c separately from an exclamation in the fourth clause 810d.

Figure 7E:
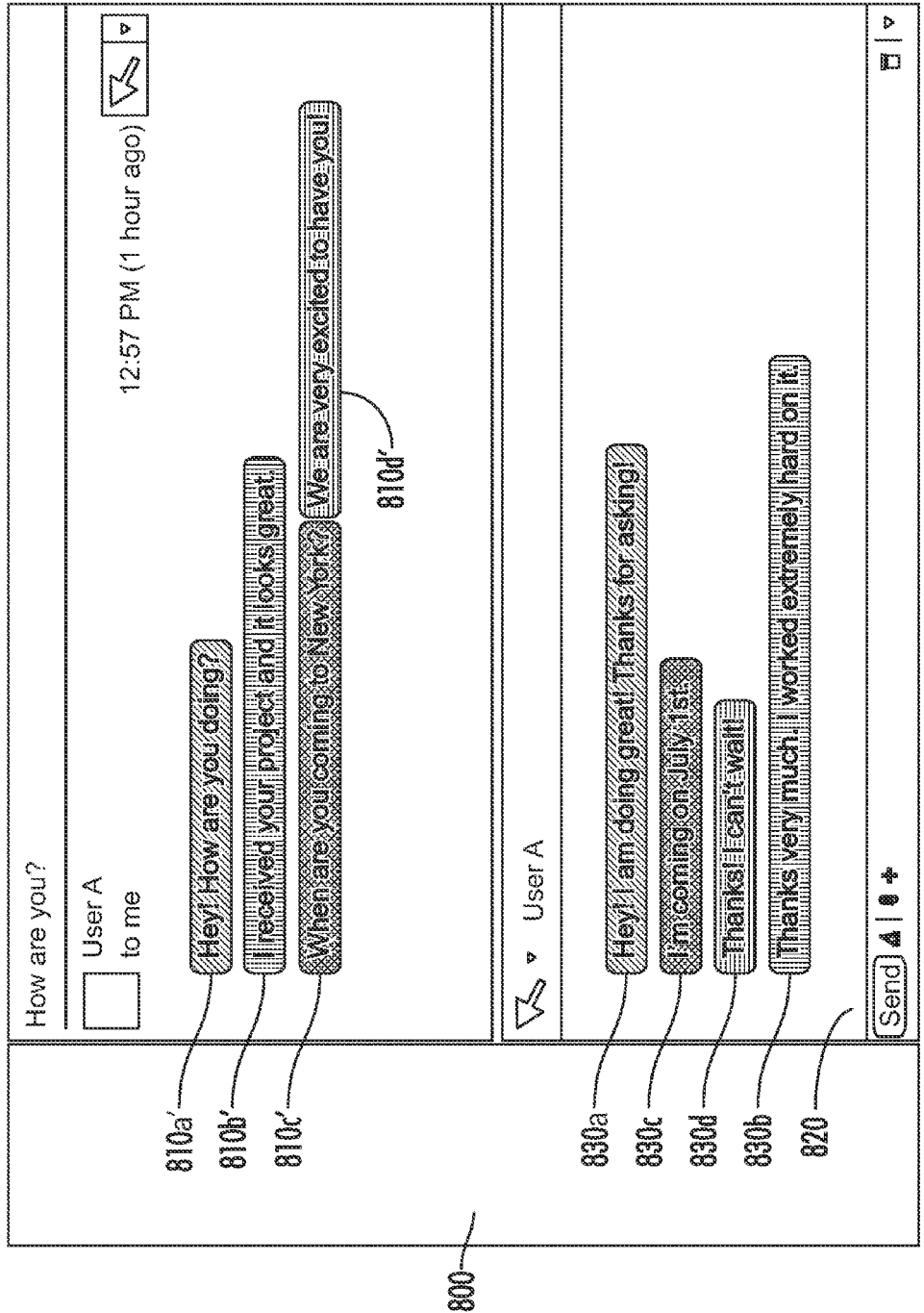

Finally, clauses may be responded to in any order, such that the user 110, after preparing responses to the first, third, and fourth clauses 810a, c, d, may then respond to the second clause 810b, by entering response 830b as shown in FIG. 7E.

Figure 7F:
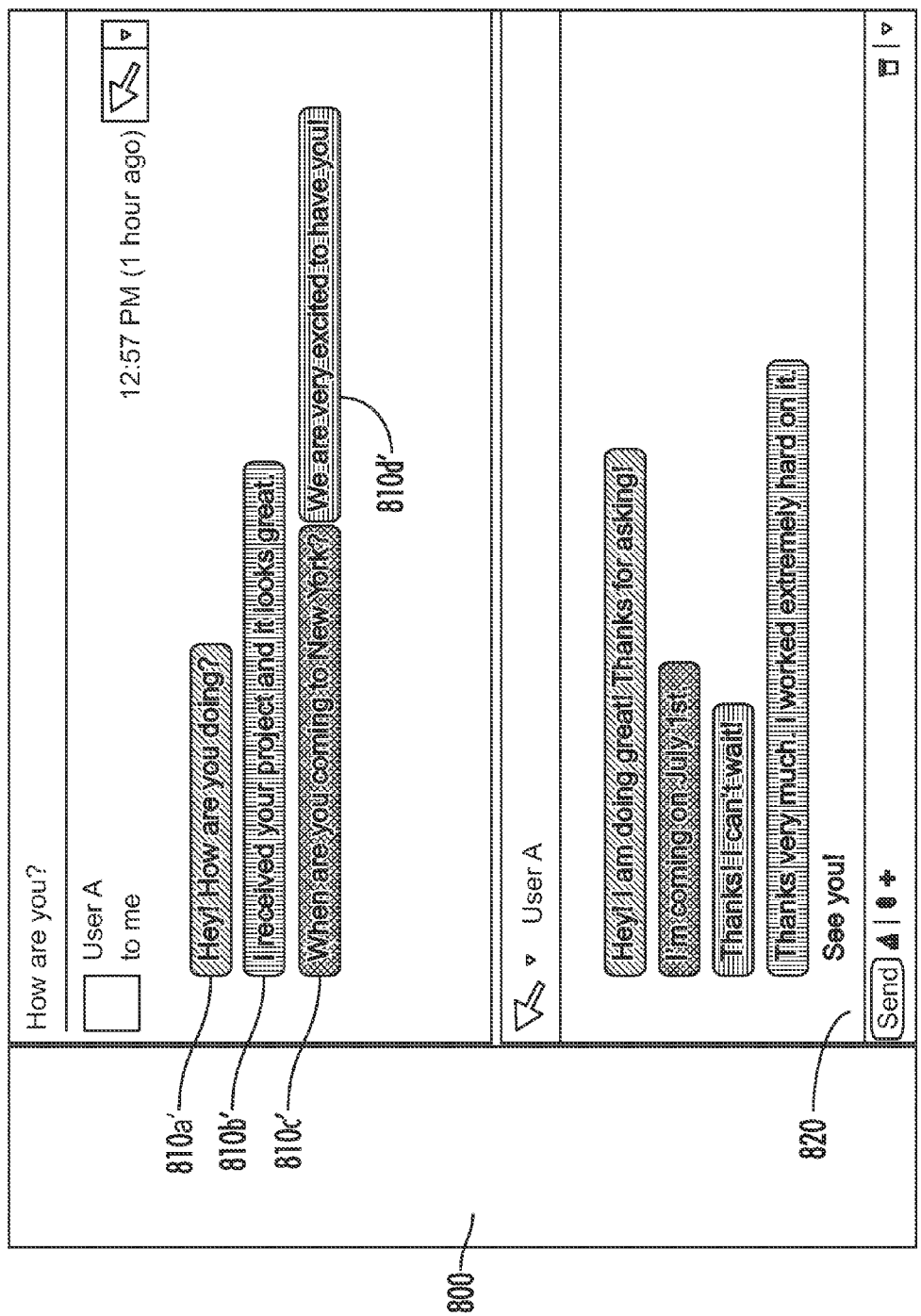

In preparing an email responsive to an email received, a user 110 may also include clauses in their response that are not responsive to any previously received message. Accordingly, a fifth response clause may be added to the message with default formatting that is not part of any defined conversation, as shown in FIG. 7F. A user may cancel a previously defined active conversation by selecting a new conversation to be active or by selecting a blank space in the received email window 800.

As discussed in more detail above, the responses to each clause 830a-d is paired to the corresponding clause by way of a visual cue. This may be a matching color tying conversations together or a matching crosshatching pattern, or any of the other interface device settings 140 as discussed above.

Typically, an email platform may have a default method of breaking up text into blocks to be treated as the clauses described above. In such scenarios, the platform may recognize each paragraph independently by default. However, a user may want to respond to two separate portions of a single paragraph independently, and may therefore override the default breakup of the text. Accordingly, a user 110 may select a default block of text 610a by using a first selection method, such as tapping at a touch screen of an interface device 100, and may select a portion of a default block of text 610c, or multiple blocks of text, using an alternate selection method, such as by clicking and dragging across the text to select.

The formatting to be used on a given interface device 100 may be defined at that device in settings 140 defined by the corresponding user 110. Accordingly two users conversing may each have their own visual cue assigned, such as a customized color scheme, or font options.

Figure 8:
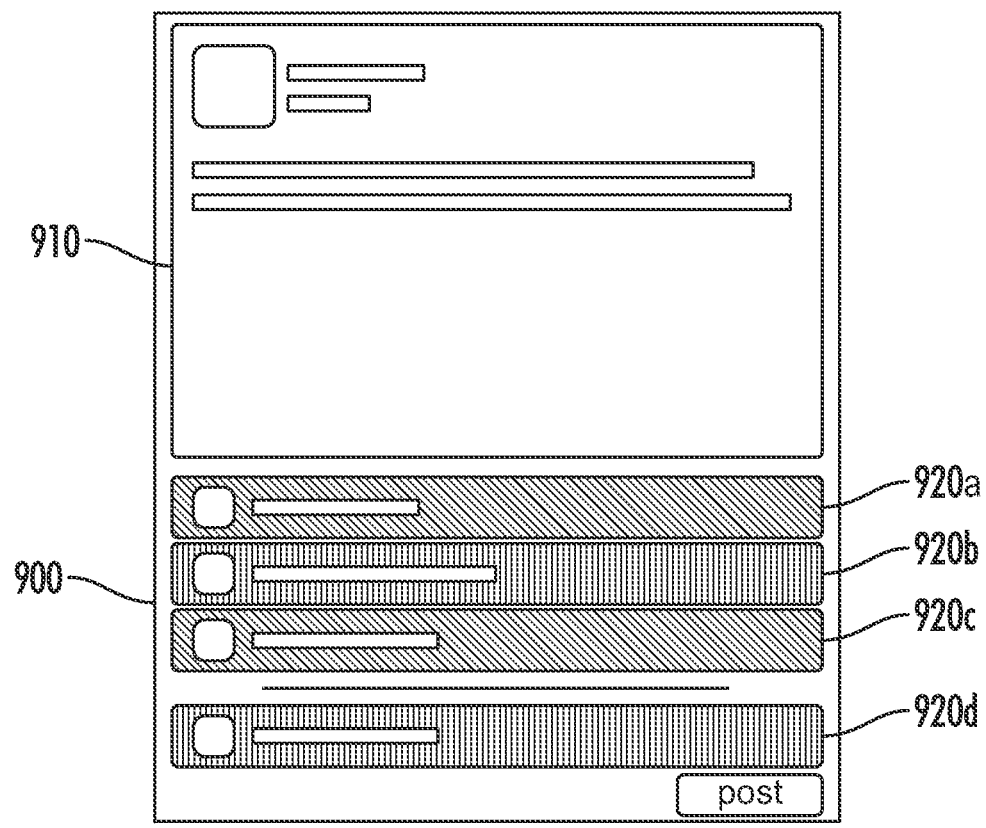
FIG. 8 shows the method of FIG. 2 implemented in a commenting system.

FIG. 8 shows the method for correlating conversations applied to a commenting system 900, such as on a website or in an online forum. Such an interface may be nearly identical to the that discussed above with respect to group chat interface 700, but may be appended to an object 910 that the discussions apply to, or may be incorporated into a website. Accordingly, multiple comments 920a-d may be assigned to one of two conversations, with a first conversation comprising the first and third comments 920a, c, and the third conversation comprising the second and fourth comments 920b, d.

Figure 9:
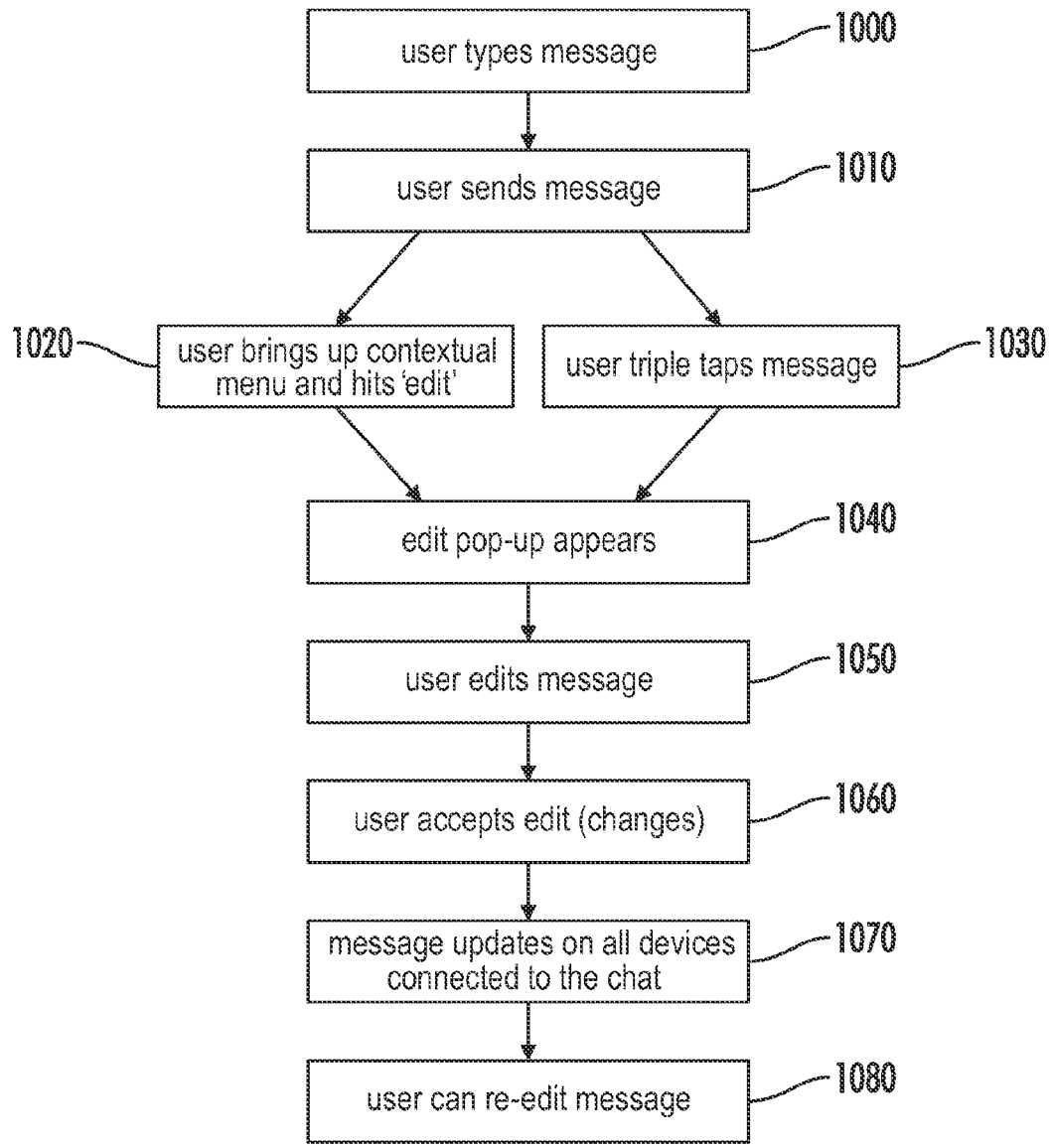
FIG. 9 is a flowchart illustrating a method for retroactively editing messages.

FIG. 9 is a flowchart illustrating a method for applying retroactive editing features to a discussion interface, such as that described in FIGS. 2-3, and FIGS. 10A-F show a discussion application incorporating such a retroactive editing feature. In the embodiment shown, a user may type a message (1000) into a message entry location 1100 and transmit that message (1010), resulting in the message 1110 appearing in a discussion interface 1120, as shown in FIG. 10B. The user may later regret transmitting the message, or may notice a mistake in the message and may wish to correct it. Accordingly, the user may choose to modify the previously transmitted message 1110.

To do so, the user may access (1020) a contextual menu 1130, as shown in FIG. 10C, or may perform a specified action, such as triple tapping the message (1030). Such action may be defined as a "hotkey" by assigning it in user preferences specific to the interface device 100. After inputting the command to edit the message 1110, an edit pop up in which the message may be edited appears (1040) in the chat application. The user 110 may then edit (1050) the message 1110, creating a new message 1110', and accept the changes to the message (1060) by selecting an appropriate button 150 of the edit popup, as shown in FIG. 10E. After approving such edits, the message is updated, deleted, or replaced, within the discussion interface 1120, as shown in FIG. 10F, and such change may be transmitted to all interface devices 100 participating in the chat (1070). This may be done through the server 150, for example. The user may edit the modified message 1110', creating new messages 1110" replacing the previous iterations of the message.

This feature may be implemented using a wide variety of interfaces, and may be accessed by, for example, using a long press of a message to bring up a contextual menu, or double or triple tapping a message.

Limitations may be applied to this editing process in the discussion interface 1120. For example, edits may only be allowed within some time limit of the initial message transmission (1010) in order to maintain the integrity of discussions occurring within the interface. Where a time limit is applied to editing features, the use of that editing feature may reset the time limit. Accordingly, if a user is given one minute to edit a message and chooses to edit the message during that time, the user may be given one minute from the time of editing to use the editing interface again.

In some embodiments, when a first user edits a message, the second user may be given access to both the edited message and the original, unedited, message. In some embodiments, the second user may be given access to the original message only if a message has been edited after a given time limit.

In all of the interfaces described, the methods discussed ultimately assign messages to individual conversations, such that such conversations may be more easily tracked by users 110. These interfaces may then provide additional features to aid the visualization of such conversations by. Several examples are now described.

Upon displaying a variety of conversations, as shown in FIG. 3G for example, a user may select one of the conversations, defining that conversation as active. The application may then highlight that conversation in a variety of ways relative to other conversations. For example, various aspects of the interface, such as the message entry location and the discussion interface may have backgrounds that can be tinted to correlate with the visual cue of the active conversation. Similarly, a tint may be applied to a virtual keyboard shown. In some embodiments, the message entry location may be modified so that text entered appears in the same format and with the same visual cues as will appear when the text is transmitted, while in others, a tint is applied so that the currently active conversation is clear.

In some embodiments, the discussion interface may apply a filter so that all conversations other than the active conversation are removed from the display. In others, all conversations other than the active conversation remain present but are faded such that the active conversation is most prominent. Alternatively, if one conversation has ended both others are ongoing, a user may apply a filter to remove the concluded conversation and retain all other active conversations. Accordingly, a single question and answer sequence not relevant to other conversations may be easily removed.

Messages described in this application are typically illustrated as text based messages, but may incorporate or comprise image, video, or audio messages as well. In such scenarios, a visual cue may be applied to the message in the form of a background color, for example.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" and like terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A computer based method for correlating conversations in a messaging environment, the method comprising:
   providing a discussion interface at a first interface device, wherein the discussion interface displays a first message and a second message;
   providing a message entry location for inputting new messages, the message entry location associated with the discussion interface, receiving, at the first interface device, a first indication that the first message is part of an active conversation;
   changing a visual element of the message entry location upon receipt of the first indication to match a first visual cue shared by messages associated with the active conversation;
   receiving a first new message at the message entry location; and
   displaying the first new message within the discussion interface at the first interface device,
   wherein the displaying of the first new message incorporates the first visual cue shared by messages associated with the active conversation.

2. The computer based method of claim 1 wherein the first indication is generated by a tapping input at a touch sensitive display of the first interface device.

3. The computer based method of claim 1 wherein the visual cue is a first color assigned to the first conversation, and wherein the second message is displayed in a second color.

4. The computer based method of claim 1 further comprising:
   displaying the first new message in the discussion interface without incorporating the first visual cue prior to receiving the first indication, and displaying the first new message in the discussion interface with the first visual cue incorporated after receiving the first indication.

5. The computer based method of claim 1, wherein the first message is part of a first conversation and the second message is part of a second conversation, the method further comprising:
   defining, upon receiving the first indication, the first conversation as the active conversation, and
   defining the first new message as part of the first conversation,
   wherein the first visual cue is incorporated into any previously displayed messages that are part of the first conversation.

6. The computer based method of claim 5 further comprising:
   receiving, at the first interface device, after displaying the first new message, a second indication that the second message is part of an active conversation;

defining, upon receiving the second indication, the active conversation as the second conversation exclusively;

receiving a second new message at the message entry location; and displaying the second new message in the discussion interface at the first interface device;

wherein the displaying of the second new message incorporates a second visual cue shared by messages associated with the second conversation.

7. The computer based method of claim 6 wherein the first and second new messages are displayed in the discussion interface in the chronological order in which they were received.

8. The computer based method of claim 7 further comprising:

changing a visual element of the message entry location upon receipt of the first indication to match the first visual cue, and upon receipt of the second indication, changing the visual element of the message entry location match the second visual cue, such that the visual element of the message entry location matches the defined active conversation.

9. The computer based method of claim 8 wherein the visual element is a background color.

10. The computer based method of claim 1 further comprising:

providing the discussion interface at a second interface device, wherein the discussion interface includes the first message and a second message;

receiving, at the second interface device, the first indication;

displaying the first new message at the second interface device, wherein the displaying of the first new message incorporates a third visual cue shared solely by messages associated with the active conversation of the first indication.

11. The computer based method of claim 10 wherein the first indication is generated at the first interface device and is received at the second interface device from one of a server or the first interface device.

12. The computer based method of claim 10 wherein the first visual cue and the third visual cue differ and are based on user preferences at each of the first user interface device and the second user interface device.

13. The computer based method of claim 1 wherein the visual element is a background color.

14. The computer based method of claim 1 wherein the first visual cue is in the form of proximity such that the first new message is displayed at a location within the discussion interface in closer proximity to the first message relative to proximity of the second message to the first message.

15. A system for correlating conversations, the system comprising an interface device in communication with a computerized network, the interface device comprising:

a processor for implementing a software application on the interface device;

a memory for storing the software application and for storing a plurality of messages in accordance with the software application;

a transmission unit for transmitting messages to the computerized network; and a display, wherein the software application comprises instructions for:

providing a discussion interface at the display of the user interface device for displaying messages stored in the memory;

providing a message entry location for entering new messages, the message entry location associated with the discussion interface;

recording an indication that one of several conversations, each comprising one or more of the messages stored in memory, is an active conversation;

modifying a visual element of the message entry location based on which of the conversations is the active conversation;

receiving at least one new message entered at the message entry location;

transmitting, using the transmission unit, the at least one new message to the computerized network incorporating an indication of which of the several conversations was the active conversation at the time of entry of the new messages; and displaying, at the display, the at least one new message alongside the several conversations and incorporating visual cues shared with any messages that are part of the conversation that was the active conversation upon entry of the at least one new message.

16. The system of claim 15, wherein the display is a touch screen, and wherein the indication recorded that one of the several conversations is the active conversation is a tapping input at the display.

17. The system of claim 15 wherein the visual element is a background color.

18. The system of claim 15, wherein the memory further stores user preferences, and wherein the visual cues are defined in the user preferences.

* * * * *